May 29, 1951  R. J. VICKERS  2,554,759
GATE FASTENER
Filed Sept. 30, 1949
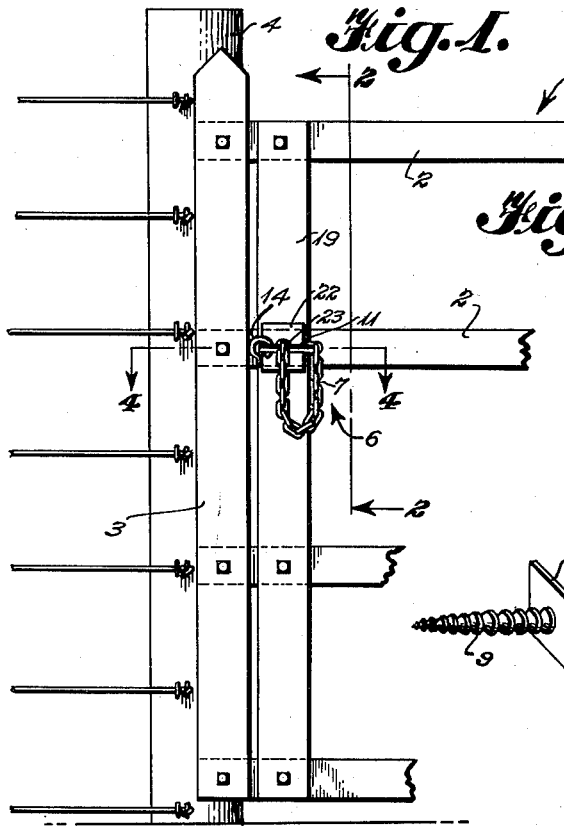
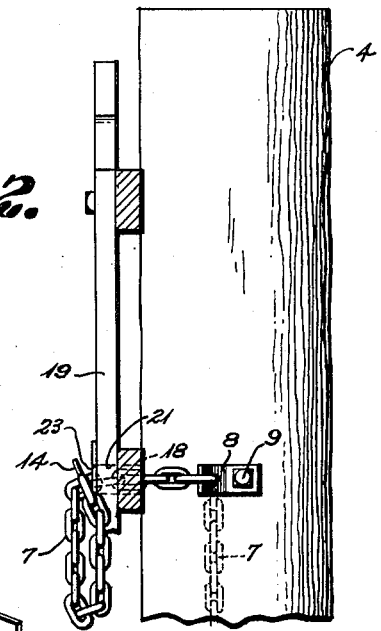
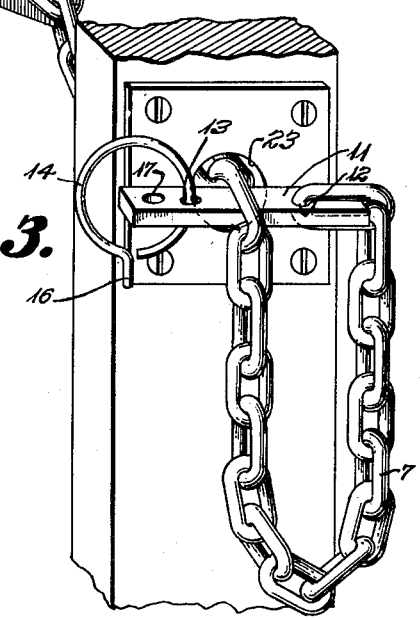
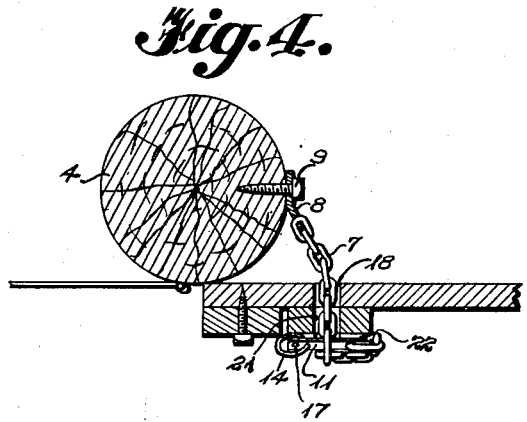
INVENTOR.
*Reginald J. Vickers*
BY
*Bacon + Thomas*
ATTORNEYS Patented May 29, 1951

2,554,759

UNITED STATES PATENT OFFICE 2,554,759

GATE FASTENER

Reginald J. Vickers, The Plains, Va.

Application September 30, 1949, Serial No. 118,941

5 Claims. (Cl. 292—264)

The present invention relates to a gate fastener and more particularly to such a fastener which is especially adapted for locking farm gates against the escape of animals.

As is well known to all engaged in agricultural pursuits, a very real problem exists on the farm in keeping animals confined within the bounds of the pasture. It is a well recognized fact that animals are familiar with the purpose of a gate and will spend many hours attempting to open the same by utilizing sheer weight, rubbing against the fastener or even in some instances, particularly in the case of horses, employing the teeth. Great damage often results from the escape of animals from their proper confine, for instance, by the trampling of crops and gardens and many useful hours are utilized in the rounding up of animals which have strayed afield.

Therefore, it is particularly necessary that a farm gate fastener be of maximum effectiveness and positive in its action. It is also necessary, however, that the construction of the fastener be such that the animals cannot injure themselves in their efforts to open the gate.

Accordingly, it is a primary object of the present invention to provide a gate fastener, which cannot in any manner be opened by animals.

Another object of the present invention is to provide a gate fastener, which will be incapable of injuring animals attempting to open the gate secured thereby.

It is also an object of the present invention to provide a gate fastener which can, if desired, be secured against opening by human trespassers.

It is a still further object of the present invention to provide a gate fastener which will operate effectively in connection with all gates even if they have sagged badly and become misaligned either before or after installation of the fastener.

Yet another object of the present invention is to provide a gate fastener which may be easily installed on any gate without the employment of skilled labor.

Another object of the present invention is to provide a gate fastener, which may be operated with maximum ease and speed.

Another and further object of the present invention is to provide a gate fastener possessing all of the desirable attributes listed above and which is simple in construction, economical, and of maximum effectiveness.

Still further objects of the present invention will be apparent from the following detailed description of the same taken in conjunction with the accompanying drawings, in which:

Fig. 1 is a front elevational view showing the device in operation upon a gate in closed position;

Fig. 2 is an enlarged sectional view taken on the line 2—2 of Fig. 1, looking in the direction of the arrows;

Fig. 3 is an enlarged fragmentary perspective view including portions of the gate showing the fastener in greater detail; and Fig. 4 is an enlarged sectional view taken on the line 4—4 of Fig. 1, looking in the direction of the arrows.

Referring now more particularly to the drawings, the numeral 1 generally designates the gate to be fastened, which may be of conventional construction and have the usual rails 2 and vertical end member 3. The numeral 4 denotes the slam post of the fence against which the upright end member of the gate will abut in closed position. The gate 1 is securely held against the post 4 in closed position by the fastener, which is the subject-matter of the present invention, and is designated generally by the numeral 6.

The fastener 6 comprises a flexible elongated member which will preferably be in the form of a chain 7, although it is to be understood that any other member of suitable flexibility and strength having spaced apertures therein could be substituted for the preferred chain, if desired. One end of the chain 7 is secured to an attaching device 8 as by having the last link of the chain pass through an aperture in an offset portion of the same. The fastening device 8 is adapted to be secured to the side of the slam post 4 by a screw 9 or other suitable means.

To the end of the chain 7, remote from that at which it is secured to the post 4, is fastened a locking key 11 preferably by causing the final link of the chain to pass through an aperture 12 in the body portion of the key. The key 11 is preferably of elongated bar form for easy insertion and is of such dimension that it will readily pass through any of the intermediate links of the chain for a reason, which will become apparent hereinafter.

The body portion of the key 11 is provided with an aperture 13 spaced from the point of attachment of the key with the chain 7. The aperture 13 is adapted to receive a split locking ring 14 formed of spring steel. The locking ring 14 is preferably formed with an offset end portion 16 so that the separation point of the ring may be readily located even in the dark.

The locking key 11 may also be provided with an aperture 17 adapted to receive a padlock for securing the gate against trespass by humans, if desired.

The gate 1 is provided with an aperture 18 for insertion of the locking key 11 and chain 7 therethrough. The positioning of the aperture 18 is not critical, but it has been found in practice that the most desirable point is adjacent the outer edge of the gate post 4 so that movement of the chain 7 is not restricted and through one of the upper of the rails 2, although preferably not the uppermost rail. For strengthening purposes and to distribute the pressure, it has been found desirable to provide the gate with an upright member 19 secured to the rails 2 by any suitable means and provided with an aperture 21 registering with aperture 18. To protect against wear, a metal plate 22 is secured to the upright member 19 with an aperture 23 therein registering with the apertures 18 and 21.

It is believed that the operation of the instant device will be readily apparent from the above description. In order to secure the gate the locking key 11 and chain 7 are inserted through the aperture 18 in the gate which is then closed so that end member 3 is pressed tightly against the post 4. The locking key 11 is then inserted through the link in the chain, which is immediately adjacent the plate 22 and the gate is thereby securely held in place. Insertion of the locking spring 14 through aperture 13 will obviously prevent any displacement of the locking key 11 from the link through which it is inserted no matter in what manner pressure is applied by an animal seeking to open the gate. Insertion of a padlock through the aperture 17 will prevent displacement of the key 11 by any unauthorized human, such as a trespasser. When the fastening device is not in use, the chain 7 will assume the position shown in dotted lines in Fig. 2.

I claim:

1. A gate fastener for a gate adapted to close against a slam post and having an aperture therethrough adjacent said slam post when said gate is closed, comprising: a chain adapted to be secured at one end to said slam post and comprising a plurality of links; a locking key secured to the other end of said chain, said locking key being insertable in the one of said links next adjacent the outer side of said gate after said locking key and said chain have been passed through said aperture in said gate and said gate closed; and means preventing displacement of said locking key from said one of said links removably secured to said locking key at a point spaced from that at which said locking key is secured to said chain.

2. A gate fastener for a gate adapted to close against a slam post and having an aperture therethrough adjacent said slam post when said gate is closed, comprising: a chain adapted to be secured at one end to said slam post and comprising a plurality of links; a locking key secured to the other end of said chain, said locking key being insertable in the one of said links next adjacent the outer side of said gate after said locking key and said chain have been passed through said aperture in said gate and said gate closed, said locking key having an aperture therein spaced from the point at which said chain is secured to said locking key; and a locking ring insertable in said aperture in said locking key whereby said locking key is maintained against displacement from said link.

3. A gate fastener for a gate adapted to close against a slam post and having an aperture therethrough adjacent said slam post when said gate is closed, comprising: a chain adapted to be secured at one end to said slam post and comprising a plurality of links; a locking key secured to the other end of said chain, said locking key being insertable in the one of said links next adjacent the outer side of said gate after said locking key and said chain have been passed through said aperture in said gate and said gate closed, said locking key having an aperture therein spaced from the point at which said chain is secured to said locking key; and a split locking ring insertable in said aperture in said locking key whereby said locking key is maintained against displacement from said link, said locking ring having an offset portion marking its point of separation.

4. A gate fastener for a gate adapted to close against an abutting surface and having an aperture therethrough adjacent said surface when said gate is closed, comprising: a chain including a plurality of links; means for securing one end of said chain to said surface; a locking key of elongated bar form dimensioned so as to readily pass through an intermediate link in said chain adjacent the outer side of said gate after said locking key and said chain have been passed through said aperture in said gate; and means preventing accidental displacement of said locking key from said link after insertion.

5. A gate fastener for a gate adapted to close against a slam post and having an aperture therethrough adjacent said slam post when said gate is closed, comprising: an elongated flexible member adapted to be secured at one end to said slam post and having an aperture therein spaced from said end by a distance at least the thickness of said gate; a locking key secured to the other end of said flexible member, said locking key being insertable in said aperture in said flexible member after said locking key and said flexible member have been passed through said aperture in said gate and said gate closed; and means removably secured to said locking key at a point spaced from that at which said locking key is secured to said flexible member for preventing displacement of said locking key from said aperture in said flexible member.

REGINALD J. VICKERS.

REFERENCES CITED

The following references are of record in the file of this patent:

UNITED STATES PATENTS

| Number | Name | Date |
| --- | --- | --- |
| 448,880 | Hansen | Mar. 24, 1891 |
| 1,294,406 | Corbett | Feb. 18, 1919 |
| 1,850,367 | Winter | Mar. 22, 1932 |